United States Patent [19]

Barbeau et al.

[11] Patent Number: 5,624,738
[45] Date of Patent: Apr. 29, 1997

[54] NONSLIPPING LAMINATE MULTIFILAMENT OUTER SHELL FOR FIREFIGHTER GARMENT

[75] Inventors: Claude Barbeau, Saint-Lambert; Ross Cochran, Ville Mont-Royal, both of Canada

[73] Assignee: Marcanada Inc., Montreal, Canada

[21] Appl. No.: 573,994

[22] Filed: Dec. 18, 1995

[51] Int. Cl.$^6$ ..................................................... B32B 27/14
[52] U.S. Cl. .................... 428/198; 2/456; 2/81; 428/196; 428/197; 428/902; 428/920; 428/921; 442/239; 442/268; 442/302
[58] Field of Search ...................... 428/196, 246, 428/252, 253, 902, 920, 921, 247, 197, 198, 284, 287; 2/2, 81

[56] References Cited

U.S. PATENT DOCUMENTS

| | | |
|---|---|---|
| 4,188,445 | 2/1980 | Hill ............................................. 428/246 |
| 4,255,817 | 3/1981 | Heim ................................................ 2/2 |
| 4,869,947 | 9/1989 | Hirayoglu ................................. 428/252 |
| 4,937,136 | 6/1990 | Coombs .................................... 428/233 |
| 5,007,112 | 4/1991 | Lewis, Jr. et al. ............................. 2/79 |
| 5,014,357 | 5/1991 | Wiseman ...................................... 2/81 |
| 5,050,241 | 9/1991 | Flowers ........................................ 2/81 |
| 5,136,723 | 8/1992 | Aldridge et al. ............................... 2/81 |

*Primary Examiner*—James J. Bell

[57] ABSTRACT

The outer shell consists of a plain weave multifilament fabric derived from aramid, polyimide, polyamide or polybenzimidazole yarns. The inner sheet is a woven, non-woven or knitted material. The two sheets are laminated with an adhesive which enables the two sheets to be laminated in such a manner that the two sheets are non slipping with respect to one another while enabling the laminate to be air permeable with a minimum of ten (10) cubic feet per minute (CFM), when tested in accordance with ASTM D737.

7 Claims, No Drawings

NONSLIPPING LAMINATE MULTIFILAMENT OUTER SHELL FOR FIREFIGHTER GARMENT

BACKGROUND OF THE INVENTION

1. Field of the invention

This invention relates to an improved outer shell for a fire-resistant garment, such as a firefighter protective garment. More particularly, the present invention is concerned with a laminated outer shell made of plain multifilament woven fabric and another textile or non textile material, which is non slipping and non fraying and is more resistant than those made from a twill fabric or has a better air permeability than those which are coated with an antislip finish. The air permeability must be of at leat ten (10) cubic feet per minute (CFM), when tested in accordance with ASTM D737.

2. Description of Prior Art

Firefighter protective garments usually consist of three or more discrete layers of fire-resistant materials. The various layers are normally:

1) the outer shell which provides protection against puncture, cuts, flame and heat;

2) the moisture barrier substrate and moisture barrier polymer which, although fire-resistant, have as their principal purpose protection against liquid penetration (in certain cases they are permeable to perspiration vapor to increase wearer comfort);

3) the thermal barrier insulation whose principal function is to provide protection against heat transfer; and 4) the inner lining or face cloth (which is normally quilted to the thermal barrier insulation) which protects the thermal barrier from wear from the inside of the garment, and provides a last layer of heat and flame protection.

An outer shell of good quality does not slip or fray. Slipping occurs when yarns of one direction, e.g. warp, are displaced laterally with respect to the yarns in the other direction, e.g. fill. Fraying occurs when yarns separate from the fabric matrix at the exposed edges of fabric weave.

Slipping and fraying are common to multifilament fabrics.

Slipping and fraying in non-fire resistant fabrics of multifilamentary yarns can be controlled by heat setting. However, the inherently fire-resistant properties of the multifilamentary yarns composing many fire-resistant fabrics render heat setting ineffective.

One method of overcoming slippage and fraying of fabrics consisting of multifilamentary yarns is to introduce a certain proportion of spun yarns into either the warp direction, the fill direction or both warp and fill directions of the fabric weave. However, the differences in chemical and fire-resistant properties between the multifilamentary and spun yarns may create a fabric that does not have the desired performance characteristics.

Another method for overcoming slippage and fraying consists of a coating or laminated film on one or both surfaces of the fabric to immobilize the yarns with respect to one another. However, this method reduces the air permeability of the fabric and may render a garment made of the fabric less comfortable.

It is an object of the present invention to provide an outer shell for a firefighter garment which is free of slippage and fraying and which is also permeable to air.

It is another object of the present invention to provide an outer shell for a fire-resistant garment which maximizes the insulation value to weight ratio of the garment.

Outer shells for fire-resistant garments are disclosed in the following U.S. Pat. Nos.:

4,188,445
4,255,817
4,937,136
5,007,112
5,014,357
5,050,241
5,136,723.

However, none of these references teach a product which combines maximum insulation with reduced slippage and fraying.

SUMMARY OF INVENTION

The above and other objects of the present invention may be achieved in an outer shell for firefighter garment which comprises a laminate formed of a first sheet of plain weave multifilament fabric derived from aramid, polyimide, polyamide, polybenzimidazole yarns and a second sheet of woven, non-woven or knitted material. Adhesive means enable the first sheet and the second sheet to be laminated in such a manner that the first sheet and the second sheet are each non slipping relative to one another, and such that fraying of the individual sheets is inhibited, while enabling the resulting laminate to be air permeable with a minimum of ten (10) cubic feet per minute (CFM) when tested in accordance with ASTM D737.

DESCRIPTION OF PREFERRED EMBODIMENTS

Preferably, the first sheet consists of a weave of warp and weft yarns which are multifilamentary aramid, polyimide or polybenzimidazole yarns. The second sheet may be made of woven, non-woven, or knitted material.

The first sheet preferably consists of a plain weave of multifilamentary aramid yarns.

In accordance with a preferred embodiment, the first sheet and the second sheet are laminated with a spider web bond or a plurality of dot bonds therebetween allowing the laminate to be air permeable.

The laminate according to the invention is prepared by any well known lamination process except that the adhesive is deposited such as by spraying so as to produce a spider web bond rather than a continuous film, thereby enabling the laminate to be air permeable. An example of the adhesive that may be used includes the moisture curing PUR prepolymer hot melt adhesive.

We claim:

1. In a firefighter garment including a fire-resistant outer shell, moisture barrier and thermal liner, the improvement wherein said outer shell comprises a laminate formed of a first sheet of plain weave fabric derived from inherently fire-resistant multifilamentary aramid, polyimide, polyamide, polybenzimidazole yarns; a second sheet of woven, non-woven or knitted fire-resistant textile material, and adhesive means enabling said first sheet and said second sheet to be laminated in such a manner that said first sheet and said second sheet are non-slipping relative to one another and such that fraying of either sheet is inhibited while enabling said laminate to be air permeable, with a minimum of ten (10) cubic feet per minute (CFM), when tested in accordance with ASTM D737.

2. A outer shell for firefighter garment according to claim 1, wherein said first sheet consists of a weave of warp and weft yarns which are multifilamentary aramid, polyimide or polybenzimidazole yarns.

3. A outer shell for firefighter garment according to claim 1, wherein said first sheet consists of a plain weave of multifilmentary aramid yarns.

4. A outer shell for firefighter garment according to claim 1, wherein said second sheet is a woven material.

5. A outer shell for firefighter garment according to claim 1 wherein said second sheet is a non-woven material.

6. A outer shell for firefighter garment according to claim 1, wherein said second sheet is a knitted material.

7. A outer shell for firefighter garment according to claim 1, wherein said first sheet and said second sheet are laminated with a spider web bond or a plurality of dot bonds therebetween allowing said laminate to be air permeable.

\* \* \* \* \*